UNITED STATES PATENT OFFICE.

HARRY CLAY TAZEWELL, OF WILMINGTON, DELAWARE.

INSULATING COMPOSITION AND PROCESS OF PRODUCING IT.

1,190,814.  Specification of Letters Patent.  Patented July 11, 1916.

No Drawing.  Application filed February 1, 1915. Serial No. 5,544.

*To all whom it may concern:*

Be it known that I, HARRY CLAY TAZE-WELL, a citizen of the United States, residing in the city of Wilmington, county of New Castle, State of Delaware, have invented certain new and useful Improvements in Insulating Compositions and Processes of Producing Them; and I do hereby declare the following to be a full, clear, and exact description of the invention, such as will enable others skilled in the art to which it appertains to make and use the same.

My invention relates to a new and useful composition of matter, intended for use particularly in the repair of damaged insulation of commutators for electric motors and generators, and, in general, applicable to similar insulating purposes, whether for repairs or in original installations.

A main characteristic feature of the invention consists in the fact that the compound may conveniently be made up in stick form and may be melted off by means of a blow torch, or the like, in such manner that it can be applied in drops at and along the place to be insulated, as, for instance, along the intervals separating adjacent commutator bars. The compound is, furthermore, non-inflammable at the temperature required for melting it in the blow torch flame, and, when melted, it is sufficiently liquid to introduce itself into all parts of the space which it is designed to occupy, before it finally sets; and, in setting, it does so without appreciable shrinkage and with a degree of hardness which is particularly appropriate to the uses for which it is mainly intended. For commutator purposes, it has the further advantage that its surface takes on a smooth polish and is found to have practically no tendency to the accumulation of grit and dirt.

The basis of the compound is creosote oil, in which is incorporated shellac. For purposes of economy, rosin may be substituted in part for the shellac, and the quality of non-inflammability is imparted to the compound by the addition of potash alum, which is found to be serviceable for the purpose. The alum further serves to toughen the sticks to be molded from the compound, and to somewhat raise its melting point, to the advantage of the compound both in its application and in its subsequent use as an insulator.

The relative proportions of the several ingredients, in the preferred practice of the invention, will be indicated by the following typical example, in which is likewise indicated the preferred method of compounding the ingredients. Three quarters of a pint of creosote oil is poured into an open receiving vessel, until it stands at about half of the depth of the receptacle. The receptacle is heated by means of a steam jacket incasing it along the sides and bottom, the steam jacket receiving the steam at a pressure of one hundred pounds per square inch. The creosote oil is heated, under these conditions, for a period of about one hour, at the end of which time it has sufficiently thickened. Thereupon about one-half pound of shellac is introduced into the oil gradually and with stirring, until it becomes homogeneously incorporated therewith. Rosin, to the amount of one-quarter of a pound is likewise added gradually and with stirring, but may be omitted, provided that its place is taken by a like quantity of shellac. In fact, as hereinbefore indicated, the addition of the rosin is for the purpose of cheapening the cost of the compound, it being found that it can be employed as a part substitute for the shellac, with results that are closely comparable to the employment of shellac alone in the composition. About half an ounce of potash alum is then added slowly and with continuous stirring, until it is thoroughly incorporated in the compound. The heat is maintained during the entire operation and until the alum has entirely dissolved. The composition is then ready for casting and may be molded in any desired shape,—preferably in the form of sticks of say one-quarter of an inch in diameter and which may, therefore, be readily held by the operator in subsequently applying the compound to the locations in which it is to be used as an insulator. The creosote oil which I have found particularly adapted to the practice of the invention is known commercially as "pine tar creosote."

What I claim is:

1. The method of producing a composition of matter applicable for insulating purposes, which comprises heating creosote oil, introducing shellac into the oil until it has become homogeneously incorporated therewith and then dissolving alum in the heated mass, the ingredients being used in suitable proportions to form a composition which can be melted off by a torch and which when melted is non-inflammable and sufficiently liquid to flow into place before setting; substantially as described.

2. The method of producing a composition of matter applicable for insulating purposes, which comprises heating creosote oil, introducing shellac and rosin into the oil until they have become homogeneously incorporated therewith and then dissolving alum in the heated mass, the ingredients being used in suitable proportions to form a composition which can be melted off by a torch and which when melted is non-inflammable and sufficiently liquid to flow into place before setting; substantially as described.

3. A new insulating composition of matter which can be molded and cast and which can be melted off by a torch, comprising creosote oil, shellac and alum, said composition being non-inflammable at the temperature of melting in the blow torch flame, and being when molten sufficiently fluid to flow into place before setting, and setting hard without appreciable shrinkage; substantially as described.

4. A new insulating composition of matter which can be molded and cast and which can be melted off by a torch, comprising creosote oil, shellac, rosin and alum, said composition being non-inflammable at the temperature of melting in the blow torch flame, and being when molten sufficiently fluid to flow into place before setting, and setting hard without appreciable shrinkage; substantially as described.

In testimony whereof I affix my signature, in presence of two witnesses.

HARRY CLAY TAZEWELL.

Witnesses:
CHARLES P. COLTON,
JOHN CRAIG.